United States Patent [19]

Dane

[11] Patent Number: 4,599,995
[45] Date of Patent: Jul. 15, 1986

[54] LINEAR COLLECTOR FOR A PARABOLIC REFLECTOR

[76] Inventor: John A. Dane, 8823 Shellie La., Boise, Id. 83704

[21] Appl. No.: 668,992

[22] Filed: Nov. 7, 1984

[51] Int. Cl.⁴ .............................................. F24J 2/10
[52] U.S. Cl. ..................................... 126/438; 126/444
[58] Field of Search ............... 126/438, 439, 444, 443, 126/445, 442

[56] References Cited

U.S. PATENT DOCUMENTS

| | | | |
|---|---|---|---|
| 4,089,325 | 5/1978 | Brola | 126/438 X |
| 4,170,985 | 10/1979 | Authier | 126/438 X |
| 4,173,968 | 11/1979 | Steward | 126/438 |
| 4,256,088 | 3/1981 | Vindum | 126/438 X |
| 4,267,826 | 5/1981 | Hitt, Jr. | 126/443 X |

*Primary Examiner*—Larry Jones
*Attorney, Agent, or Firm*—Paul F. Horton

[57] ABSTRACT

A parabolic reflector having support structure, mounted upon a rotatable track, for supporting a parabolic dish framework to which is mounted one or more support panels to which, in turn, are pivotally mounted a plurality of reflectors for focusing rays on a linear collector. The support panels include a plurality of concave recesses operable to receive bowl-shaped reflectors provided with polygonal rims so that the sides of adjacent reflectors will be in registry with one another. The support panels are provided with bolts, outwardly extending from the base of each recess, the bolts being received in slotted apertures in each reflector bowl for pivoting and fastening the reflector in a preselected position for focusing solar rays upon the collector. The collector includes a heat exchange media operable to conduct heat at extremely high temperature for production of steam. A novel tracking system is also provided.

4 Claims, 12 Drawing Figures ns, reflec-
LINEAR COLLECTOR FOR A PARABOLIC REFLECTOR

BACKGROUND OF THE INVENTION

1. Field of the Invention

This invention relates generally to parabolic reflectors and more particularly to support structures, reflectors, tracking systems, and collectors therefore.

2. Description of the Prior Art

Many parabolic reflectors have been devised to focus solar rays on a point, at which a collector is placed, as typified by the D. E. Wood U.S. Pat. Nos. 4,171,876; 4,295,709; and 4,372,772, and the Osborn U.S. Pat. No. 4,335,578. Where rays are focused on a point, rather than a line, greater tolerance is allowed for mis-alignment of reflectors. Where solar rays are focused on a line, i.e., on a linear collector, as typified by U.S. Pat. No. 4,407,129 issued to B. W. Johnson, focusing becomes more critical. Mirrored glass has been found to be the best reflector for solar rays, but large glass sections are prohibitively expensive. It is also highly desirable that the glass be curved to provide higher operating temperatures because of superior focus. Attempts have been made in the prior art to forcibly curve a plane sheet of glass, but such curvature is inadequate and distorted; extensive breakage may occur, and panes under such force are not individually focusable.

SUMMARY OF THE INVENTION

The present invention overcomes problems of focusing efficiency found in the prior art by providing a parabolic reflector including a novel tracking system supporting dish framework which, in turn, supports insulative panels provided with a plurality of recesses with attachment means for pivotal attachment of bowl-shaped reflectors. The reflectors are individually adjustable to focus solar rays upon a linear collector for flashing water to steam for power production and for purification of water. A more detailed description of the invention may be found in the appended claims.

It is therefore a principal object of the present invention to provide a parabolic reflector having a plurality of separately focusable curved glass reflectors for focusing solar rays on a linear collector.

More specifically, it is an object of the present invention to provide a support panel having a plurality of concave recesses, each recess adapted to receive and hold a concave reflector in a pre-selected focusing position.

Even more specifically, it is an object of the present invention to provide pivotal reflectors having polygonal rims for registry with rims of adjacent reflectors for superior efficiency.

It is also an object of the present invention to provide a linear collector operable to receive solar rays thus focused and to transfer heat from such rays to flash water to steam.

Another object of the present invention is to provide a tracking system having high stability and a minimum of maintenance.

Additional objects and advantages will become apparent and a more thorough and comprehensive understanding may be had from the accompanying drawings forming a part of this specification.

DETAILED DESCRIPTION OF THE INVENTION

Figure 1:
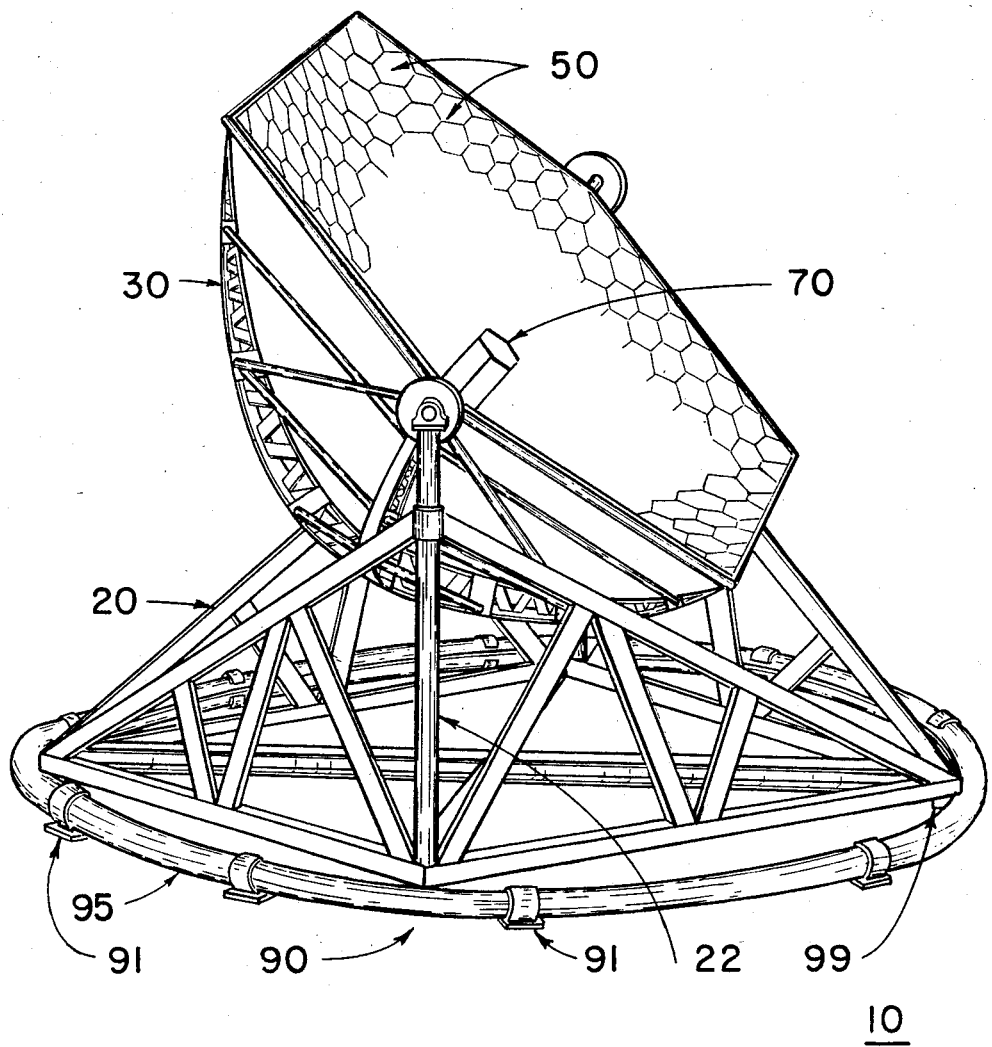
FIG. 1 is a perspective view of a parabolic reflector made in accordance with the present invention, showing individual reflector members in part.
Figure 5:
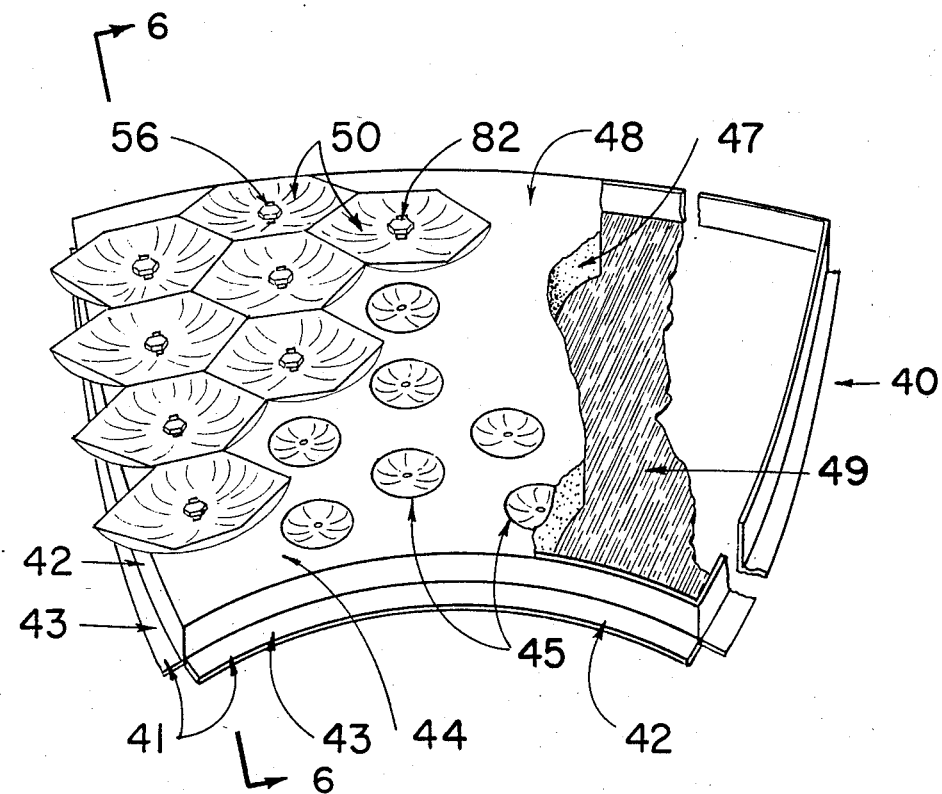
FIG. 5 is a perspective view in partial section showing the framework, support panel composition, and reflectors mounted thereon.
Figure 6:
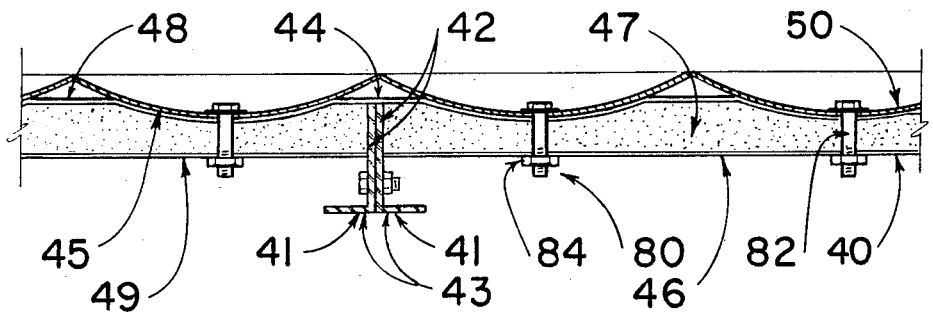
FIG. 6 is a sectional view taken along lines 6—6 of FIG. 5.

Referring now to the drawings, and, more particularly, to FIG. 1, an embodiment to be preferred of a parabolic dish reflector 10, made according to the present invention is disclosed. Parabolic reflector 10 includes a support structure 20 holding a parabolic dish framework 30 which underlies one or more support panels 40, as shown in FIGS. 5 and 6, upon which individual reflectors 50 are attached. Reflectors 50 focus solar rays upon a centrally located linear collector 70 vertically mounted at the longitudinal axis of the dish upon framework 30 and shown in outline on FIG. 1. Tracking apparatus, designated generally by the numeral 90 rotatably carries support structure 20.

Figure 9:
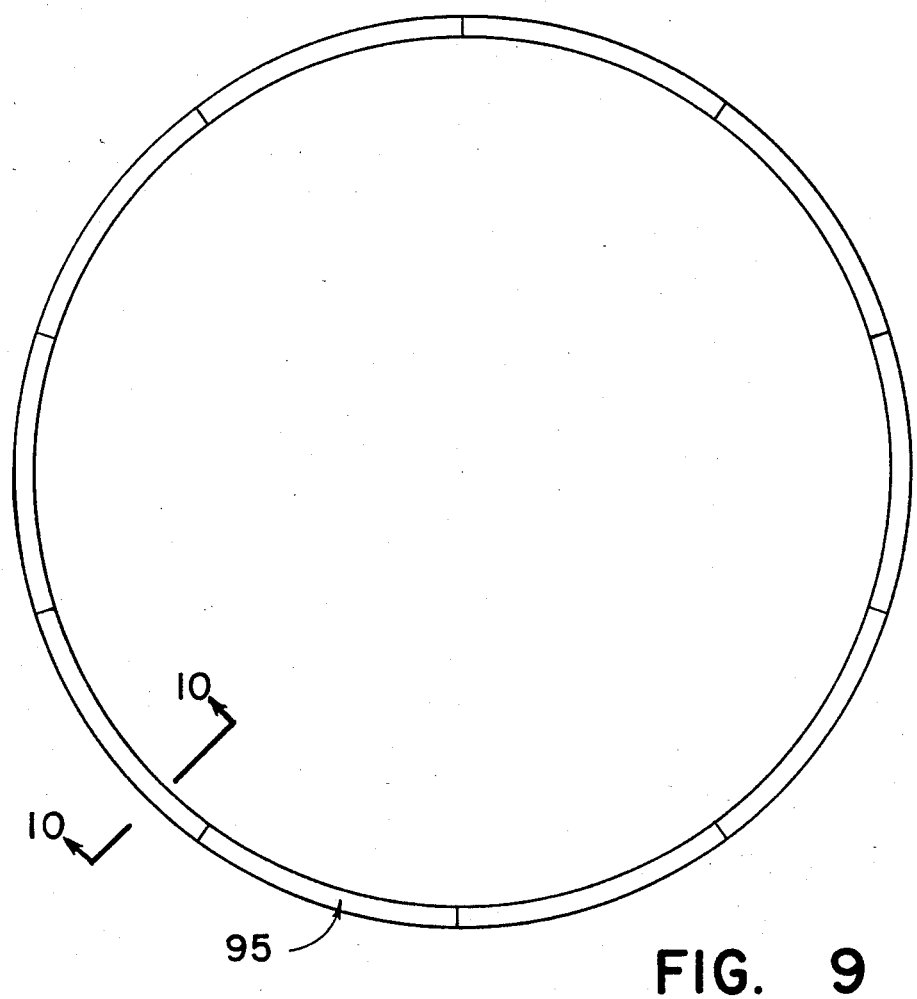
FIG. 9 is a plan view of the track of the present invention.
Figure 10:
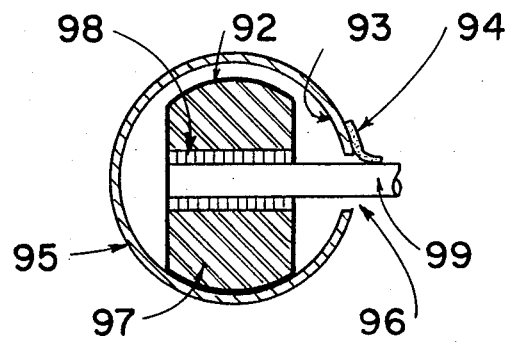
FIG. 10 is a sectional view taken along lines 10—10 of FIG. 9.

The tracking apparatus, shown to advantage in FIGS. 9 and 10, includes a circular and tubular track 95 equidistantly spaced about a vertical axis about which the reflector support structure 20 is rotated. Track 95 is circular in cross section and provided with a continuous slot 96 located on the inner curvature of the track. The track may be manufactured in sections for convenience in shipping as well as maintenance. The track is mounted to a solid foundation by a suitable number of brackets 91, shown in FIG. 1. Located in the enclosure defined by the tubular track 95 are a plurality of wheels 97, preferably four, rotatably mounted upon axles 99 by means of wheel bearings 98. Axles 99 extend laterally inward through slot 96 where they supportingly engage and carry support structure 20, as shown in FIG. 1. Two of the wheels are powered by 12 volt D.C. motors, not shown, controlled by photo-optic circuitry, allowing the reflector dish to track the sun as necessary to receive optimum amounts of solar rays. The track contacting surface 92 of each of the wheels 97 is substantially identical in shape with the inner surface 93 of track 95 for mating engagement therewith and the diameter of each wheel is only slightly smaller than the inside diameter of the tubular track, maximizing surface contact between wheel and track, yet providing for close tolerance between the top of the wheel and the inside surface of the track for stabilization and to prevent vibration. The track may be composed of any suitable material, such as steel or aluminum, and the wheels are preferably composed of rubber, plastic, or other composition having suitable load-bearing characteristics. The tracking apparatus is substantially maintenance-free in that the tubular track is extremely efficient at keeping out foreign material such as sand and water. A flexible cover 94 of rubber or plastic affixed to the track just above the slot 96 may be provided to cover the slot at all locations except at the position of the axles to further keep the track free of foreign objects. The flexible cover simply rides over the axles and drops in place on either side as the axles pass.

Figure 7:
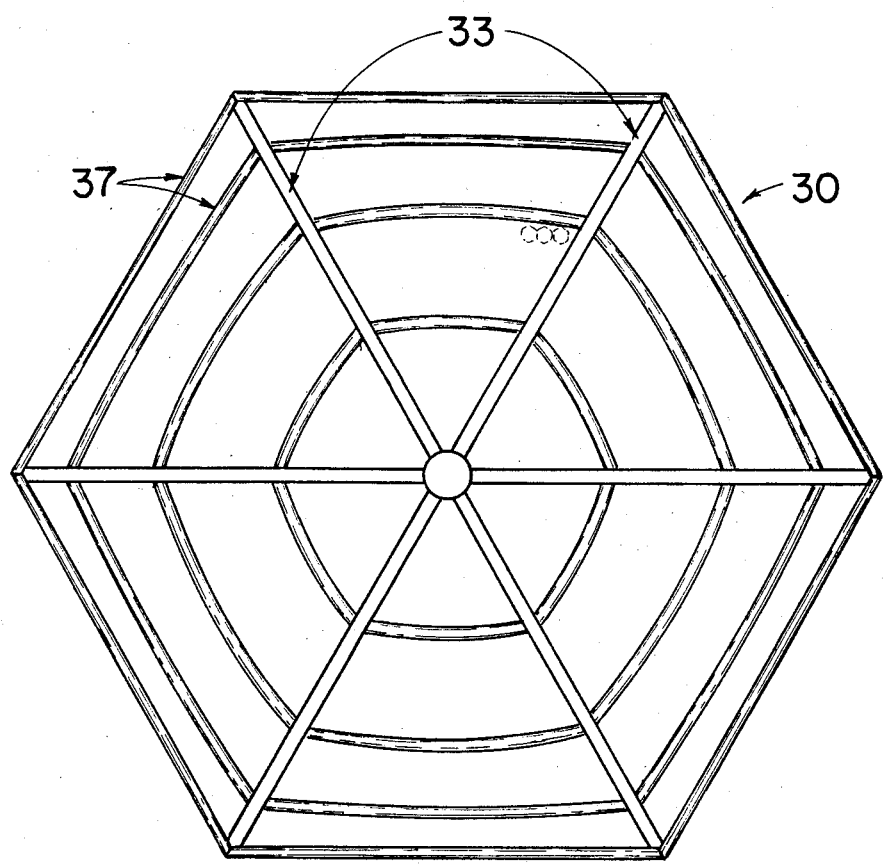
FIG. 7 is a rear view of a horizontal framework of the present invention.
Figure 12:
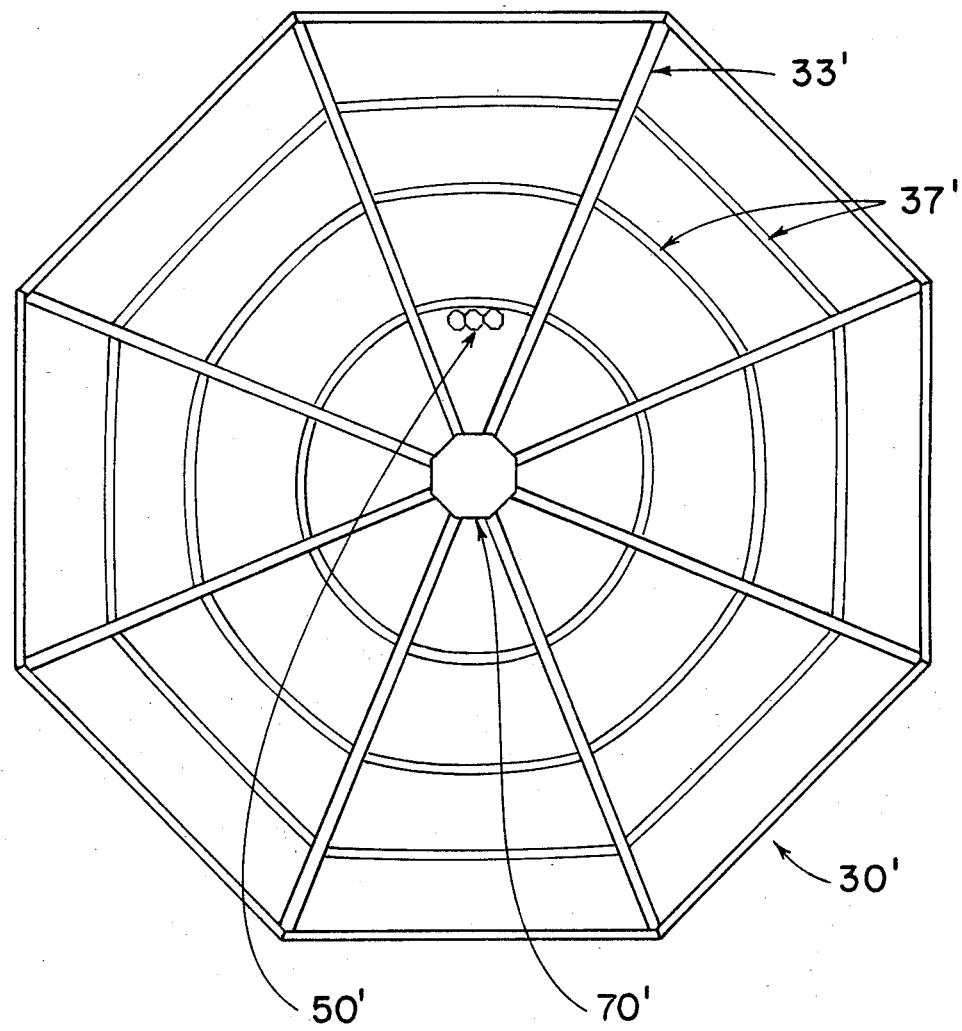
FIG. 12 is a plan view of an octagonal framework showing one panel in place having some octagonal reflectors thereon, and an octagonal collector.

Support structure 20 includes two vertical supports 22 upon which dish framework 30 is pivoted. Framework 30, in the preferred embodiment is either hexagonal or octagonal in shape, defining solar banks, and conforming to the shape of linear collector 70 and to the individual reflectors 50 indirectly carried thereupon. The framework, in the embodiment shown in FIG. 7 includes six radial support trusses 33 radially extending in a selected arc from a central support ring 35, shown in FIG. 8. Referring now to FIG. 12, framework 30' is shown in an octagonal form. The octagonal form is used to accommodate individual reflectors 50' which define an octagonal rim. In such case, a linear collector 70', octagonal in cross section is utilized for the focusing of each bank of reflectors located between each of the support trusses 33'.

Referring once again to FIG. 7, mounted laterally between adjacent radial support trusses 33 are a suitable number of lateral support struts 37, providing a mounted surface for support panels 40. Both trusses and struts are preferably constructed of aluminum because of weight considerations.

Referring now to FIGS. 5 and 6, support panels 40 may be seen to advantage. Each of the support panels is substantially trapezoidal in shape, extending in width to the radial trusses and extending in depth to the lateral supports. While the support panels may be attached to trusses and struts by any conventional means, it is preferred that each panel 40 be provided with aluminum framing 41, which may be either tubular or L-shaped, as shown. Framing 41 includes in the embodiment and shown a vertical portion 42 about the periphery of the panel and a base portion 43 by which the panel is mounted to the trusses and struts by bolts, welding or otherwise.

Each panel 40 includes a top surface 44 and a bottom surface 46 which are substantially parallel to one another. Top surface 44 defines a plurality of recesses 45 for receiving reflectors 50. Recesses 45 are concave in shape, matching the curvature of the bottom surface of the reflectors 50, and terminating in a circular upper rim planar with upper surface 44.

Each recess is provided with means, designated generally by the numeral 80, for attachment of reflectors 50. In the preferred embodiment, attachment means 80 include a bolt 82 upwardly and outwardly extending from the base of each recess 45, as shown in FIG. 6. The bolt extends through an elongated slot 56 in the reflector 50 with the head of the bolt engaging the top surface of the reflector to hold the reflector in a pre-selected position as will hereinafter be described. Each bolt is threaded only a selected distance along the shaft so that engagement by nut 84 is restricted to prevent overtightening of the nut with resultant damage to the fragile reflector. Both nuts and bolts, along with any washers which may be used, are preferably constructed of nylon, because of the flexibility required. While nut and bolt assemblies have been described, it is obvious that pins provided with clamps as fasteners or other equivalent fastening means may similarly be used.

Each panel 40 includes a body portion 47 constructed of rigid foam insulation, preferably polyurethane because of weight and insulative qualities. Adhering to the upper surface of the body portion is a vinyl coating 48 for weather protection and adhering to the bottom surface of the body portion is a fiberglass backing 49 giving added protective support.

Figure 2:
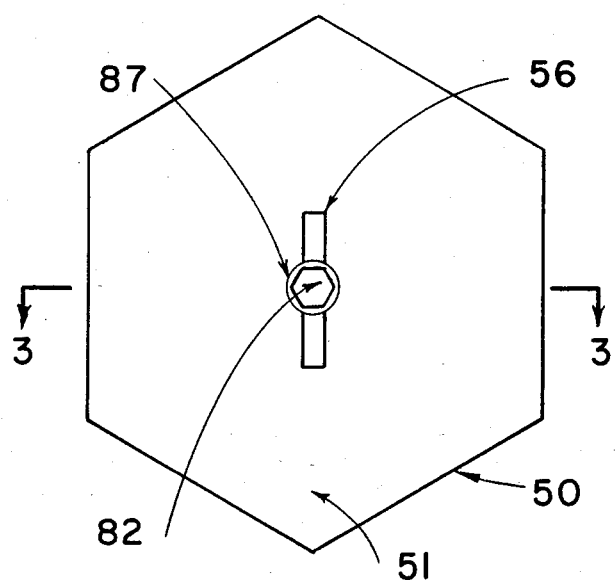
FIG. 2 is a plan view of one of the reflectors of the present invention.
Figure 3:
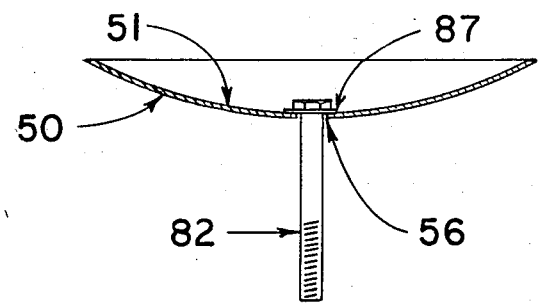
FIG. 3 is a sectional view taken along lines 3—3 of FIG. 2.
Figure 4:
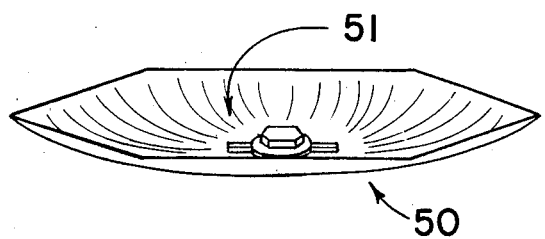
FIG. 4 is a perspective view of a reflector showing a hexagonal rim and the concave reflecting surface.

Now referring to FIGS. 2, 3 and 4, reflector members 50 may be seen. Reflector members 50 are each formed in bowl-shaped configuration having upper concave reflecting surface 51 for focusing solar rays upon a collector and a bottom surface conforming substantially with the upper surface of recesses 45 for reception therein. Each of the reflectors members 50 terminates in a rim lying in a single plane and defining a polygon and preferably a hexagon as shown in FIGS. 2, 3, and 4, or an octagon as shown in FIG. 12. It is important to note that the shape of the reflector rims dictate the shape of the entire reflector dish and the shape of the collector as aforementioned. The polygonal rims of the reflector bowls permit close registry between rim sides of adjacent reflectors, as shown in FIG. 5, for superior efficiency in reflection.

Each reflector is molded of glass or pressed and shaped of metal, and silvered or polished to produce a concave mirror. Each reflector also defines an elongated slot 56 intersecting the vertical longitudinal axis of the reflector. Slot 56 is operable to receive bolt 82 of attachment means 80 with either the head of the bolt or a nylon washer 87 engaging top surface 51 of the reflector. Each reflector 50 is pivotal within each recess 45 and is held in a selected tilted position by tightening nut 84 thereby bringing the washer or the head of the bolt into contact with the reflector for proper focus upon collector 70.

Figure 8:
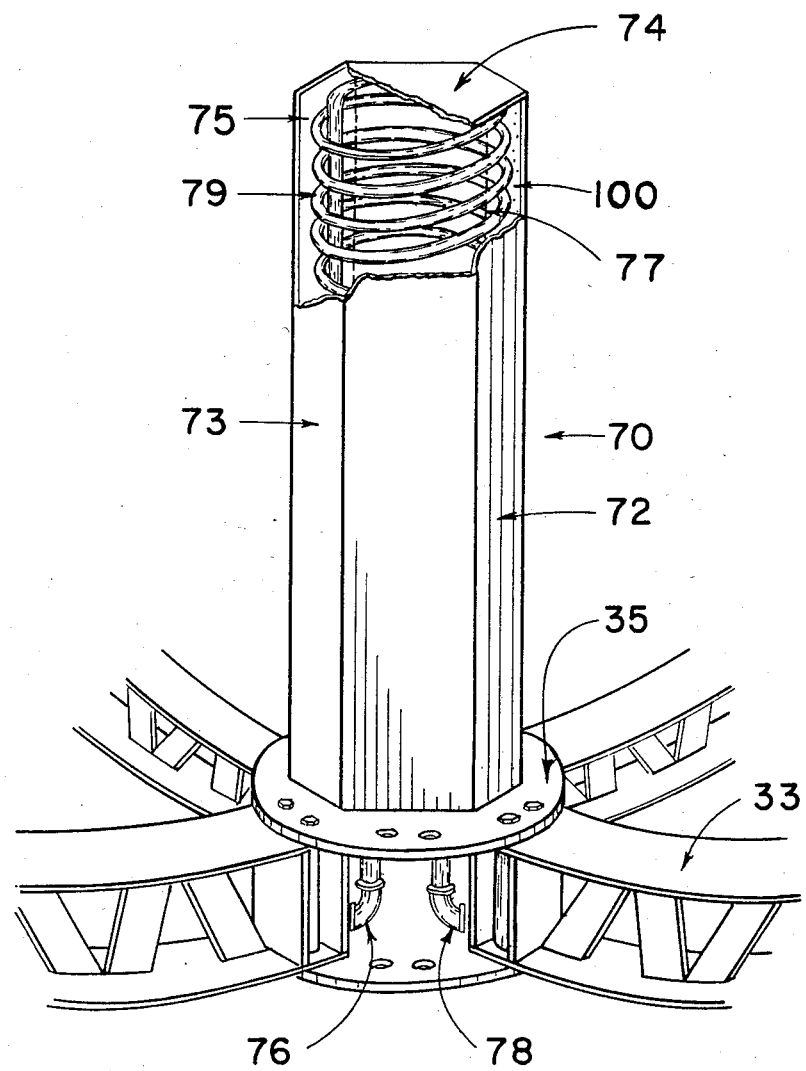
FIG. 8 is a perspective view in partial section of one embodiment of the linear collector of the present invention.
Figure 11:
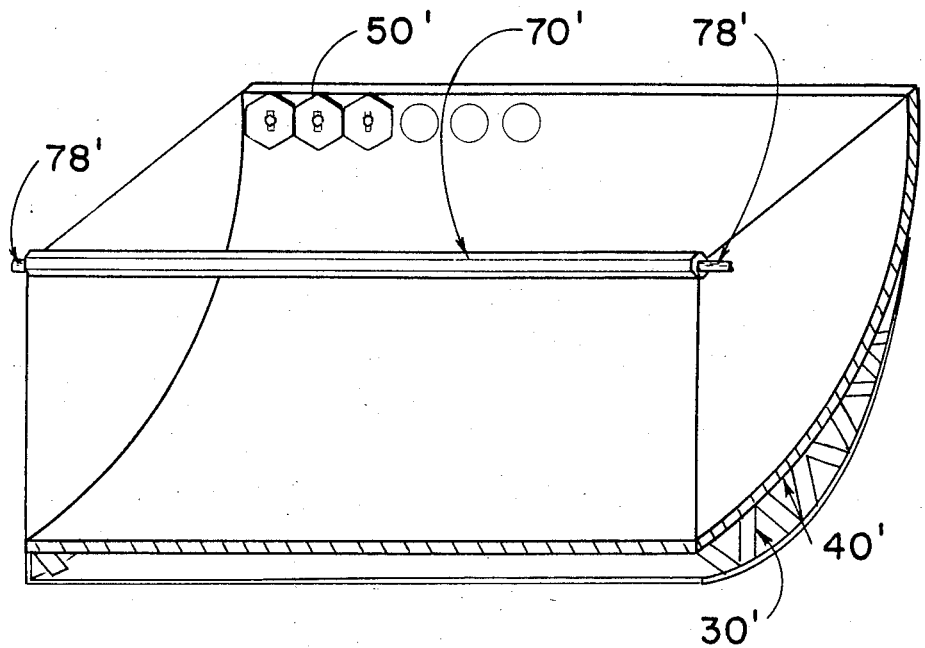
FIG. 11 is a perspective view of one embodiment of the present invention utilizing a horizontal linear collector.

Linear collector 70, shown in FIG. 8, is vertically mounted at the center of dish framework 30 to ring 35. The collector may also be mounted horizontally, as shown in FIG. 11, the collector being designated by the numeral 70'. Such positioning may be desirable where a full reflecting dish is not required or not suitable. A framework 30' holds support panels 40', which, in turn, supports reflectors 50', each structural element being equivalent to the structures of like numbers in the embodiments previously mentioned. Referring again to FIG. 8, it will be seen that collector 70 includes a housing designated generally by the numeral 72. Housing 72 includes an elongated tubular outer shell 73 and a pair of end members 74, only a portion of one such member being shown, to define an enclosure 75. In the preferred embodiment, as shown in the figure, an inner shell 77, substantially coaxial with the outer shell is also provided, the inner shell sealingly engaging the end members to define enclosure 75 therebetween. Mounted within the enclosure and between the shells is a helical coil 79 having a water inlet port 76 and a steam outlet port 78. A heat transfer media 100, preferably in the form of a fluid, serves to transfer the heat between outer shell 73 and coil 79.

While media of varying types may be used, it is preferred that a heat transfer fluid bearing the trademark "DOWTHERM LF" be used because of its low freeze point, low viscosity, and stability. A pump, not shown, may be used to circulate the media. The outer surface of outer shell 73 bears the same shape in cross section as the rim of each reflector 50 and has sides equal to the number of banks of support panels contained in the dish framework 30 as previously indicated. Where hexagonal rimmed reflectors 50 are used, framework 30 includes six banks of support panels 40 and therefore the cross sectional shape of outer shell 73 of reflector 70 is also hexagonal, as shown. The planar sides of the collector result in highly efficient absorption of solar rays focused thereupon by reflectors 50, as compared to collectors having a curved outer surface. The planar surface of the outer shell enables each reflector contained within each bank to focus thereupon. Where octagonal rimmed reflectors are used, then framework 30' is octagonal in shape, and a collector having an outer shell, octagonal in cross section, is therefore used. The outer surface of the collector is either anodized or coated with a highly absorbent agent for proper heat transference.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A collector for a parabolic reflector of the type having a multiplicity of individual reflectors terminating in a polygonal rim, said collector comprising:
   a housing including an elongated tubular outer shell, and a pair of end members sealingly engaging said shell to define an enclosure, the outer surface of said outer shell having the same polygonal shape in cross section as said individual reflectors;
   a water conducting coil mounted within said enclosure, said coil having a water intake port and a steam outlet port; and
   a heat exchange media contained within said enclosure for transferring heat from said housing to said coil.

2. The apparatus as described in claim 1 wherein said collector further comprises an inner shell, substantially coaxial with and spaced inwardly of said outer shell and said coil, said inner shell sealingly engaging said end members of said housing.

3. The apparatus as described in claim 1 wherein the outer surface of said outer shell is hexagonal in cross-section.

4. The apparatus as described in claim 1 wherein the outer surface of said outer shell is octagonal in cross-section.

* * * * *